United States Patent
Yu et al.

(10) Patent No.: US 11,196,663 B2
(45) Date of Patent: Dec. 7, 2021

(54) METHOD AND DEVICE FOR MULTI-PATH RETRANSMISSION IN A NETWORK

(71) Applicant: ALIBABA GROUP HOLDING LIMITED, Grand Cayman (KY)

(72) Inventors: Xiangning Yu, San Mateo, CA (US); Haiyang Zheng, San Mateo, CA (US); Guohui Wang, San Mateo, CA (US); Jiayao Hu, San Mateo, CA (US); Haiyong Wang, San Mateo, CA (US)

(73) Assignee: Alibaba Group Holding Limited, Grand Cayman (KY)

(*) Notice: Subject to any disclaimer, the term of this patent is extended or adjusted under 35 U.S.C. 154(b) by 100 days.

(21) Appl. No.: 16/655,183

(22) Filed: Oct. 16, 2019

(65) Prior Publication Data
US 2021/0119904 A1    Apr. 22, 2021

(51) Int. Cl.
*H04L 12/707* (2013.01)
*H04L 12/26* (2006.01)
*H04L 12/939* (2013.01)

(52) U.S. Cl.
CPC .......... *H04L 45/22* (2013.01); *H04L 43/0835* (2013.01); *H04L 45/24* (2013.01); *H04L 49/552* (2013.01)

(58) Field of Classification Search
CPC ..... H04L 45/22; H04L 43/0835; H04L 45/24; H04L 49/552; H04L 45/28; H04L 49/55–557
See application file for complete search history.

(56) References Cited

U.S. PATENT DOCUMENTS

| | | | |
|---|---|---|---|
| 6,496,477 B1* | 12/2002 | Perkins | H04L 45/00 370/228 |
| 9,419,842 B1* | 8/2016 | Galliher, III | H04L 49/1515 |
| 10,630,579 B1* | 4/2020 | Plenderleith | H04L 45/7453 |
| 2014/0126354 A1* | 5/2014 | Hui | H04L 45/28 370/225 |

OTHER PUBLICATIONS

Harry Newton, "Newton's Telecom Dictionary," 2016, United Book Press, 30th Edition, p. 1214 (Year: 2016).*

* cited by examiner

*Primary Examiner* — Maharishi V Khirodhar
*Assistant Examiner* — Kenneth P Hunt
(74) *Attorney, Agent, or Firm* — Finnegan, Henderson, Farabow, Garrett & Dunner, LLP

(57) ABSTRACT

Embodiments of the present disclosure provide methods and devices for data transmission by a switch. The method can include transmitting, by the switch, over a first path, a first packet that is received from a first host to a second host; receiving a replacement packet from the first host, wherein the replacement packet is transmitted from the first host in response to a determination that the first packet was lost and wherein the replacement packet includes a path indicator; and based on the path indicator of the replacement packet, transmitting, over a second path different from the first path, at least part of the replacement packet to the second host.

14 Claims, 9 Drawing Sheets

| Packet | Path Index | Hash Result | Flag | Path Count |
|---|---|---|---|---|
| data | 0 | 100 | 0 | 2 (Switch 203) |
| data* | 1 | 100 | 1 | 2 (Switch 203) |

Table 420

METHOD AND DEVICE FOR MULTI-PATH RETRANSMISSION IN A NETWORK

TECHNICAL FIELD

The present disclosure generally relates to the field of data transmission, and in particular, to methods and devices for multi-path retransmission in a network.

BACKGROUND

Redundant network topology is used in modern cloud data centers. Multiple tiers of switches can be deployed with multiple paths between each tier to allow for end hosts to communicate with each other. For example, each end host can connect over links with multiple tier-1 switches (e.g., Top of Rack switches), each of which can connect to multiple tier-2 switches. Accordingly, multiple paths between two end points may exist.

But even though multiple paths may exist, a network flow may not fully utilize the multiple paths. Moreover, when the network flow utilizes the TCP protocols, two-way traffic is used, sometimes resulting in the data packet and corresponding acknowledgement (ACK) travelling through different paths. Tracking this type of information can be difficult, especially when one of the links fails.

SUMMARY

Embodiments of the present disclosure provide a method for data transmission. The method can include transmitting, by the switch, over a first path, a first packet that is received from a first host to a second host; receiving a replacement packet from the first host, wherein the replacement packet is transmitted from the first host in response to a determination that the first packet was lost and wherein the replacement packet includes a path indicator; and based on the path indicator of the replacement packet, transmitting, over a second path different from the first path, at least part of the replacement packet to the second host.

Embodiments of the present disclosure also provide an apparatus for data transmission. The apparatus can comprise a memory storing a set of instructions, and one or more processors configured to execute the set of instruction to cause the apparatus to perform: transmitting, over a first path, a first packet that is received from a first host to a second host; receiving a replacement packet from the first host, wherein the replacement packet is transmitted from the first host in response to a determination that the first packet was lost and wherein the replacement packet includes a path indicator; and based on the path indicator of the replacement packet, transmitting, over a second path different from the first path, the replacement packet to the second host.

Embodiments of the present disclosure also provide a non-transitory computer readable medium that stores a set of instructions that is executable by at least one processor of a computer to cause the computer to perform a method for data transmission. The method can comprise transmitting, over a first path, a first packet that is received from a first host to a second host; receiving a replacement packet from the first host, wherein the replacement packet is transmitted from the first host in response to a determination that the first packet was lost and wherein the replacement packet includes a path indicator; and based on the path indicator of the replacement packet, transmitting, over a second path different from the first path, the replacement packet to the second host.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

Figure 1:
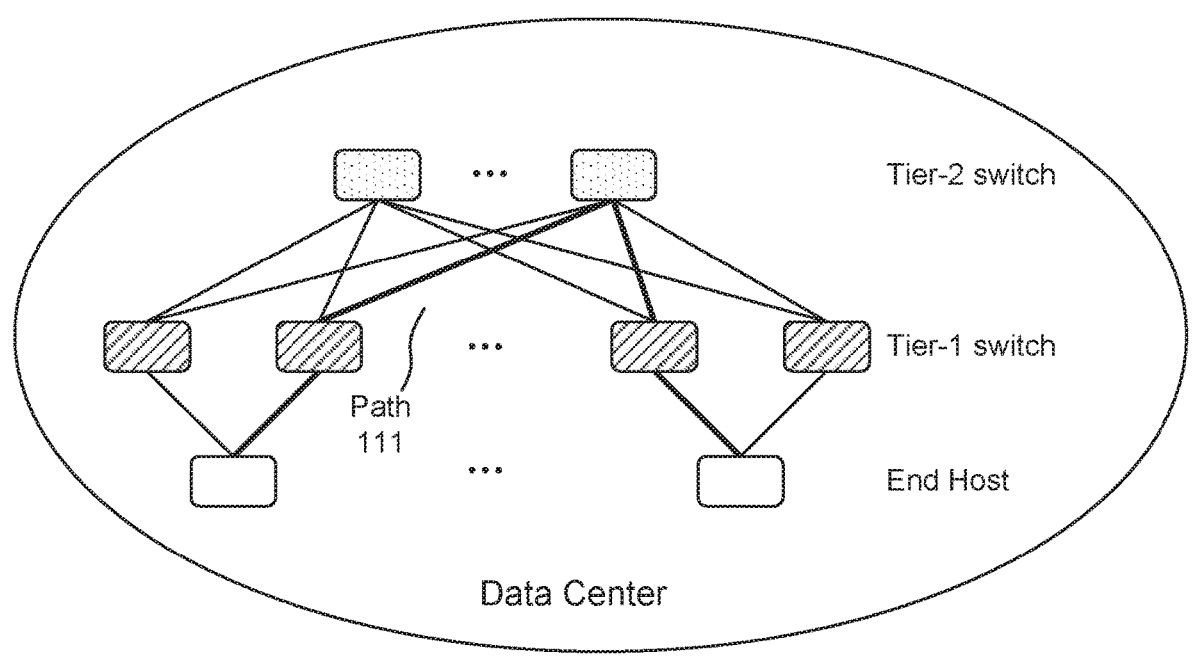
FIG. 1 illustrates a schematic diagram of an exemplary multi-path network system in a data center.

As stated above, multiple tiers of switches can be deployed with multiple paths between each tier to allow for end hosts to communicate with each other. As shown in FIG. 1, two tiers of switches are connected with end hosts. The end hosts can connect with tier-1 switches (e.g. Top of Rack switches) via multiple links. The link between the end host and the tier-1 switch is critical as path selection is limited when compared to the number of links between the switches. However, most east-west traffic (i.e., traffic between end hosts within a data center shown in FIG. 1) cannot fully take advantage of the redundant network topology. Equal-cost multi-path routing (ECMP) is usually employed on different tiers of switches that a simple stateless hashing function is used to calculate a path for a network flow. As shown in FIG. 1, a path (e.g. path 111 denoted by a thick line) is used in the network. A network flow cannot fully utilize multiple paths between two end hosts. In protocols such as TCP that generates two-way traffic, data packets and acknowledgements (ACK) are likely to travel through different paths other than using one path (e.g. path 111). Accordingly, improvements are needed.

Multi-path retransmission can be utilized to recover a failed link. In conventional solutions, if a link fails, a network flow is impacted because the packets can travel through the same path until a control plane identifies the failure and reroutes the packet. Before the control plane identifies, retransmitted packets (e.g. data and ACKs) can be lost, triggering multiple packet transmission and causing extended time of outrage. It can take 30 seconds to 1 minute to recover from a failed link with control path configurations. Improvements that involve taking advantage of multiple paths can facilitate reliable data transmission between the end hosts.

The disclosed embodiments provide an improved multi-path data retransmission system. When an alternative link is needed to resume the communication flow, the disclosed retransmission system can more efficiently route packets on a different path than those of conventional systems, thereby minimizing bandwidth and saving network resources.

Figure 2A:
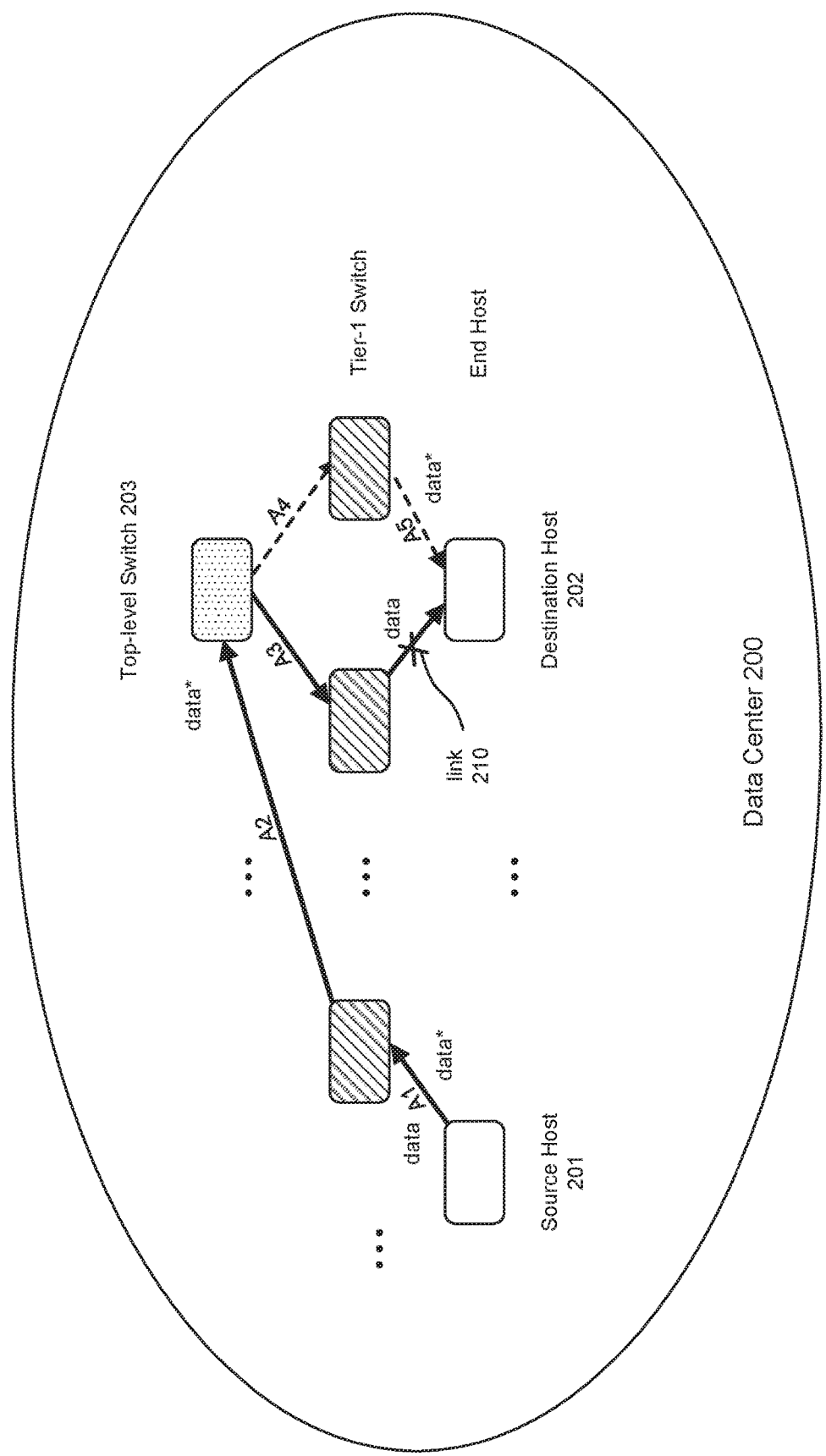
FIG. 2A illustrates a schematic diagram of an exemplary retransmission system in a data center with lost data, consistent with some embodiments of the present disclosure.
Figure 2B:
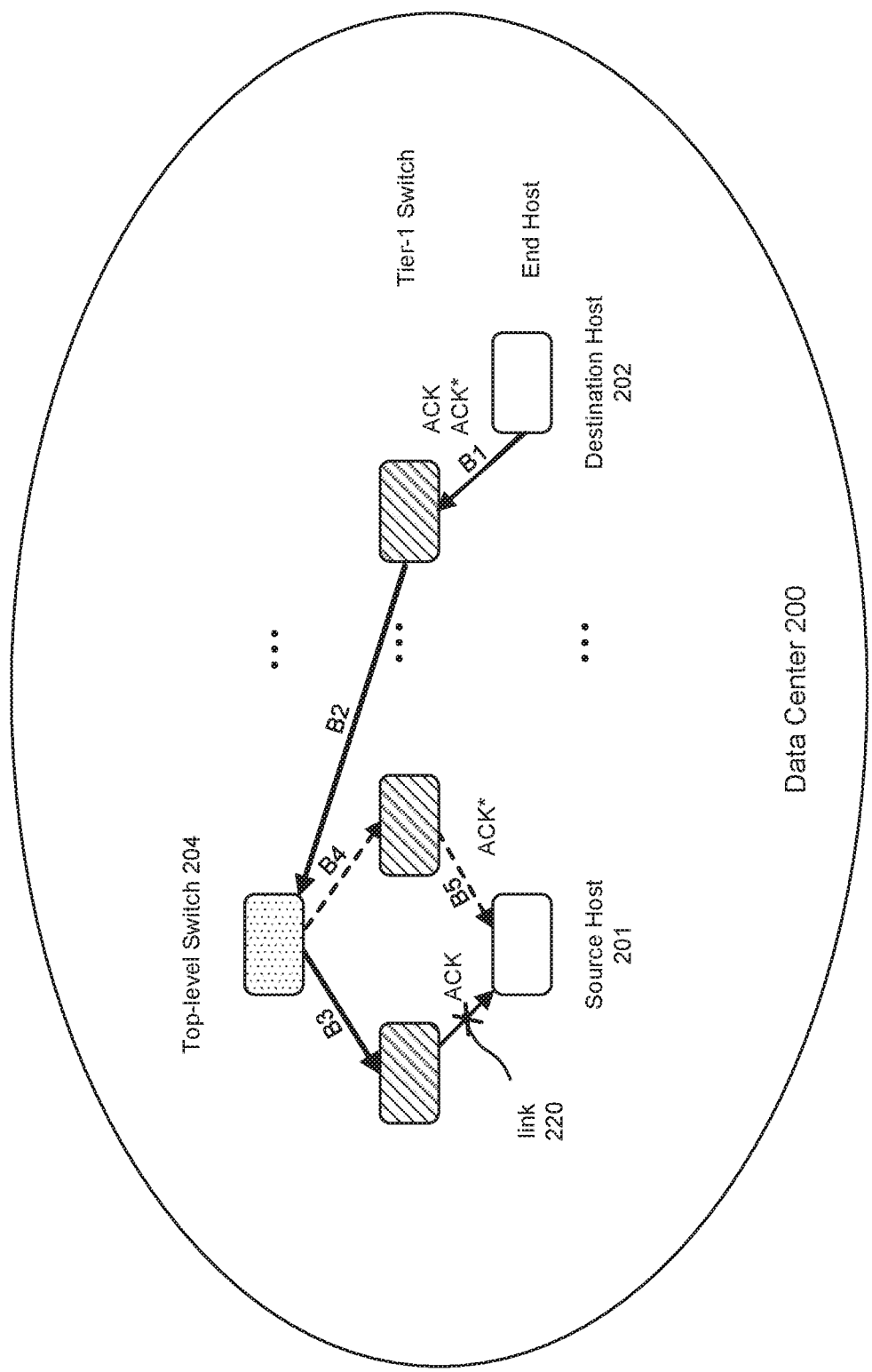
FIG. 2B illustrates a schematic diagram of an exemplary retransmission system in a data center with a lost acknowledgement, consistent with some embodiments of the present disclosure.

In an exemplary data center 200 illustrated in FIG. 2A and FIG. 2B, a source host (e.g., source host 201 shown in FIG. 2A) can transmit packets to a destination host (e.g., destination host 202 shown in FIG. 2A) via multiple switches. In one example, a top-level switch (e.g. top-level switch 203 shown in FIG. 2A) can facilitate data retransmission along with source host 201 and destination host 202. The methods of data retransmission of the source host, the top-level switch and the destination host are illustrated below with accompanying figures FIG. 2A and FIG. 2B. It is appreciated that the methods can be performed in the exemplary data center and also any other networks.

Figure 3:
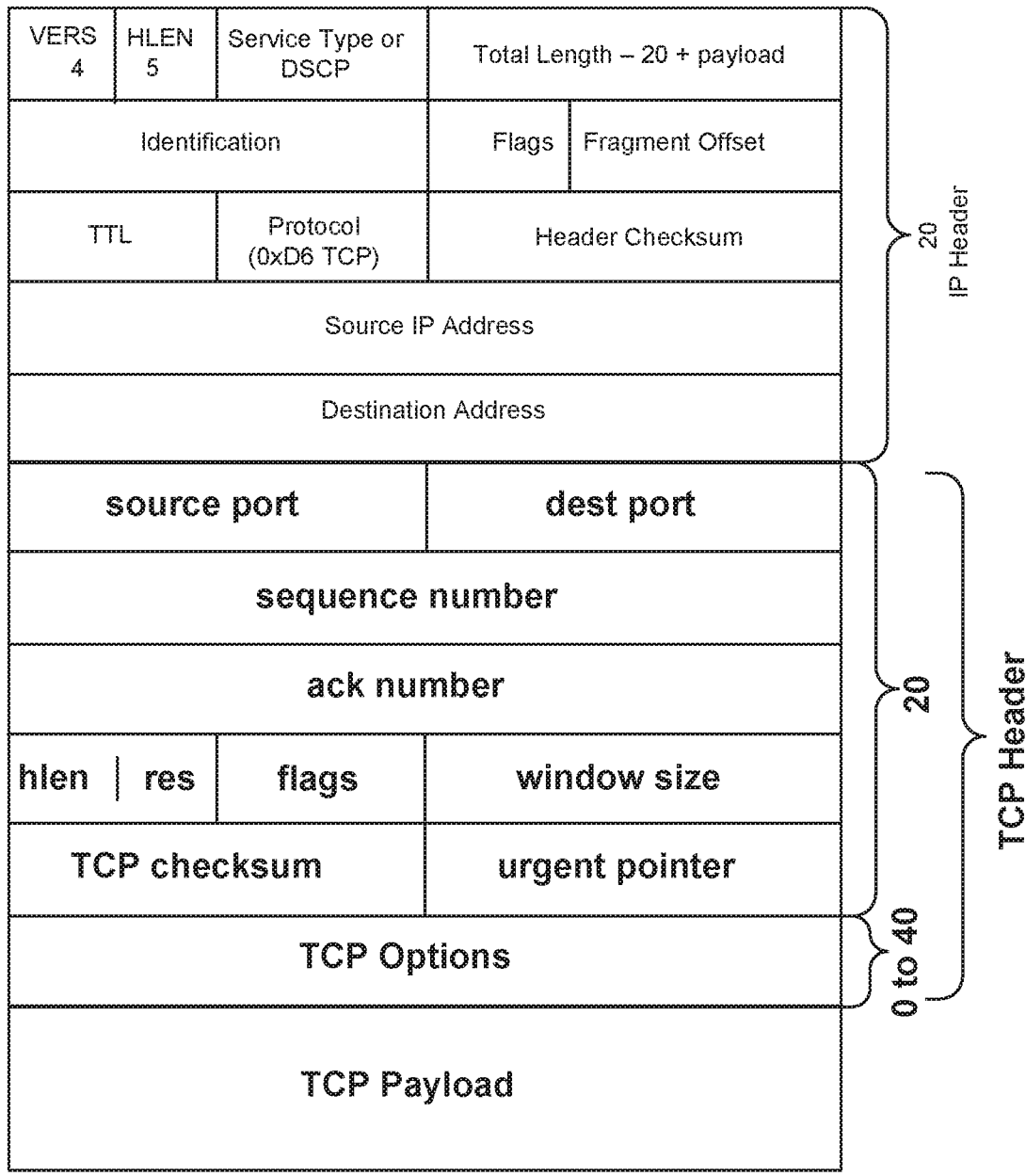
FIG. 3 illustrates a schematic diagram of an exemplary TCP/IP header, consistent with some embodiments of the present disclosure.

In exemplary data center 200 illustrated in FIG. 2A, end hosts connect with tier-1 switches via multiple links, and tier-1 switches connect with tier-2 switches via multiple links. In an example of TCP transmission between a source host (e.g., source host 201) and a destination host (e.g., destination host 202), source host 201 can send data via on a path that includes link 210 to destination host 202. When a source host transmits data to a destination host and the data is lost before being received by a destination host, TCP retransmission mechanism ensures that data is reliably sent from end to end. Source host 201 retransmits data through two tiers of switches and destination host 202. In TCP, when an acknowledgement of receipt of data is not received within a Retransmission Timeout (RTO), the retransmission is triggered. With TCP fast transmission, the retransmission can take place within a short amount time (e.g. 500 ms), which is considerably faster than recovery using control path configurations. The data packet (denoted as "data" in FIG. 2A) can travel along link A1, A2 and A3, but does not reach destination host 202 due to failed link 210. In retransmission, end host 201 can mark a retransmission packet with an indicator (for example, a reserved bit in a TCP header, or similarly, DSCP bits or TTL bits in an IP header, as shown in FIG. 3) and send the marked retransmission packet to end host 202 via routing switches.

As shown in FIG. 2A, when a tier-2 switch, which is a top-level switch (e.g., top-level switch 203), receives the marked retransmission data, top-level switch 203 can recognize that the data packet is retransmitted and a different path is needed for successful transmission. A dashed line from top-level switch 203 shows that a new path is used. The new path is different from the previous path that includes link 210. With the adaption to using a new path, the replacement data packet (denoted as data* in FIG. 2A) can be received by destination host 202. Then destination host 202 can send an ACK for confirmation of receipt. The replacement packet can travel along link A1, A2, A4 and A5 to reach destination host 202. Links A4 and A5 form the path selected by switch 203.

When the top-level switch receives the marked retransmission packet, the switch performs actions based on hardware capabilities. There are two exemplary configurations of the switch. A programmable switch can be configured to define a hashing algorithm used to select a different path for the marked retransmission packet. A non-programmable switch can be configured according to the configurations below to realize the path selection function in the method.

In some embodiments, the second path is selected using a hash algorithm. The hashing function can be used in calculating a sequence number of a path between a top-level switch and a destination host. For example, the hashing function can be based on the following equation:

$$\text{PathIndex} = (\text{Hash}(\text{IP}_{src}, \text{Port}_{src}, \text{IP}_{dst}, \text{Port}_{dst}, \text{Protocol}) + \text{Flag}) \% \text{PathCount} \quad \text{(Equation 1)}$$

where $\text{IP}_{src}$ is an IP address of the source host, $\text{Port}_{src}$ is a port number of the source host, $\text{IP}_{dst}$ is an IP address of the destination host, $\text{Port}_{dst}$ is a port number of the destination host, Protocol is the protocol used in transmission, e.g., TCP/IP, Flag is the indicator associated with path selection, PathCount is the number of paths between the top-level switch and the destination host. A 5-tuple of source port, destination port, source IP address, destination address and protocol can be contained in the TCP/IP header shown in FIG. 3. The 5-tuple is hashed for path selection in Equal-Cost Multipath Routing (ECMP) to generate an outgoing path. For example, the hash function can be a Cyclic Redundancy Check (CRC) type or an XOR type. To distribute traffic flow in available paths, a modulo is used on the hashing result of the 5-tuple along with the flag to generate a path that is different from the original path.

Figure 4:
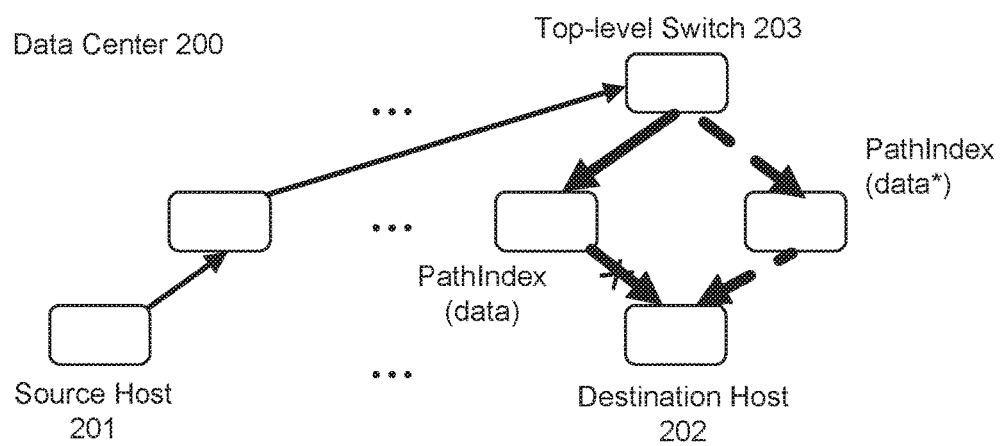
FIG. 4 illustrates a schematic diagram of exemplary path selection in data transmission in a data center, consistent with some embodiments of the present disclosure.

As shown in FIG. 4, top-level switch 203 receives a packet (a data packet or an ACK) transmitted from source host 201 to destination host 202, evaluates header information of the packet to determine a value of a flag that indicates whether the packet is a replacement packet. The replacement packet can replace a lost packet and identifies the same source host and the same destination host. When top-level switch 203 performs hashing functions on the path selection according to Equation 1, the results of $\text{Hash}(\text{IP}_{src}, \text{Port}_{src}, \text{IP}_{dst}, \text{Port}_{dst}, \text{Protocol})$ are the same for both the packet and the replacement packet. As illustrated in table 420, the results of $\text{Hash}(\text{IP}_{src}, \text{Port}_{src}, \text{IP}_{dst}, \text{Port}_{dst}, \text{Protocol})$ for both packet data and packet data* are 100.

Where the two packets are different is with respect to the flag value. For instance, for the original data packet (data), the Flag is set to 0. For the replacement packet (data*), the Flag is set to 1. The setting of this flag can provide an indicator to a switch (e.g., top-level switch 203) to select a different path, using Equation 1 above. With respect to FIG. 4, there are two paths (solid lined path and dashed lined path) available between top-level switch 203 and destination host 202, therefore the PathCount for both the packet and the replacement packet is 2. According to Equation 1, $$\text{PathIndex} = (\text{Hash}(\text{IP}_{src}, \text{Port}_{src}, \text{IP}_{dst}, \text{Port}_{dst}, \text{Protocol}) + \text{Flag}) \% \text{PathCount},$$

the value of Flag differentiates the results of PathIndex for the packet and the replacement packet, because the remainders of performing the modulo operation on (Hash( . . .

)+Flag) using PathCount are different. The Flag serves as an indication for the top-level switch to change to a different path when routing. As shown in Table 420, Path Index of the data packet is 0, and Path Index of the replacement packet is 1. Top-level switch 203 can route the packet on one path (the solid lined path between Top-level Switch 203 and Destination Host 202) based on Path Index 0, and can route the replacement packet on a different path (the dash lined path between Top-level Switch 203 and Destination Host 202) based on Path Index 1. It is appreciated that a data packet and a replacement data packet are merely exemplary packets being routed by a top-level switch, while the top-level switch can also route an ACK and a replacement ACK on two different paths according to some embodiments of the present disclosure.

Referring back to the example shown in FIG. 2A, destination host 202 receives the replacement data packet via a second path different from the initial path and sends the ACK back over the second path.

The example shown in FIG. 2B provides a scenario when the data packet is successfully transmitted from source host 201 to destination host 202 successfully, but a failed link 220 causes a loss of an ACK corresponding to the data packet. The retransmission process of FIG. 2B is similar to that shown in FIG. 2A and is described as follows along with retransmission of lost ACKs. In the exemplary network system in a data center, end hosts connect with tier-1 switches via multiple links, and tier-1 switches connect with tier-2 switches via multiple links. In an example of TCP transmission between a source host (e.g., source host 201) and a receiver (e.g., destination host 202), source host 201 can send data via a path to destination host 202 and can receive acknowledgement (ACK) from destination host 202 via a different path. When a connection on link 220 that connects source host 201 and the connected tier-1 switch is lost, the ACK is lost and source host 201 does not receive the ACK. The ACK travels along link B1, B2, and B3, but does not reach source host 201 due to failed link 220. In TCP, retransmission of the packet (TCP Retransmission or TCP Fast Transmission) is triggered within a Retransmission Timeout (RTO) when a sender (e.g. source host 201) does not receive an ACK before a retransmission timer expires. In retransmission, source host 201 can mark a retransmission packet with an indicator (for example, a reserved bit in a TCP header, or similarly, DSCP bits in an IP header) and can send the marked retransmission packet to destination host 202. Destination host 202 identifies that the received packet is marked and determines that the original ACK that was sent to source host 201 was lost. To retransmit the ACK, destination host 202 marks the ACK (denoted as ACK* shown in FIG. 2B) before sending.

When a top-level switch (e.g., top-level switch 204) receives the marked ACK, top-level switch 204 selects a different path (shown as dashed arrows in FIG. 2B) that does not include failed link 220. Top-level switch 204 can perform hashing on the path selection similar to top-level switch 203 described earlier. The replacement ACK (denoted as ACK* in FIG. 2B) can travel along link B1, B2, B4 and B5 to reach Source Host 201. Links B4 and B5 form the path selected by switch 204.

Figure 5:
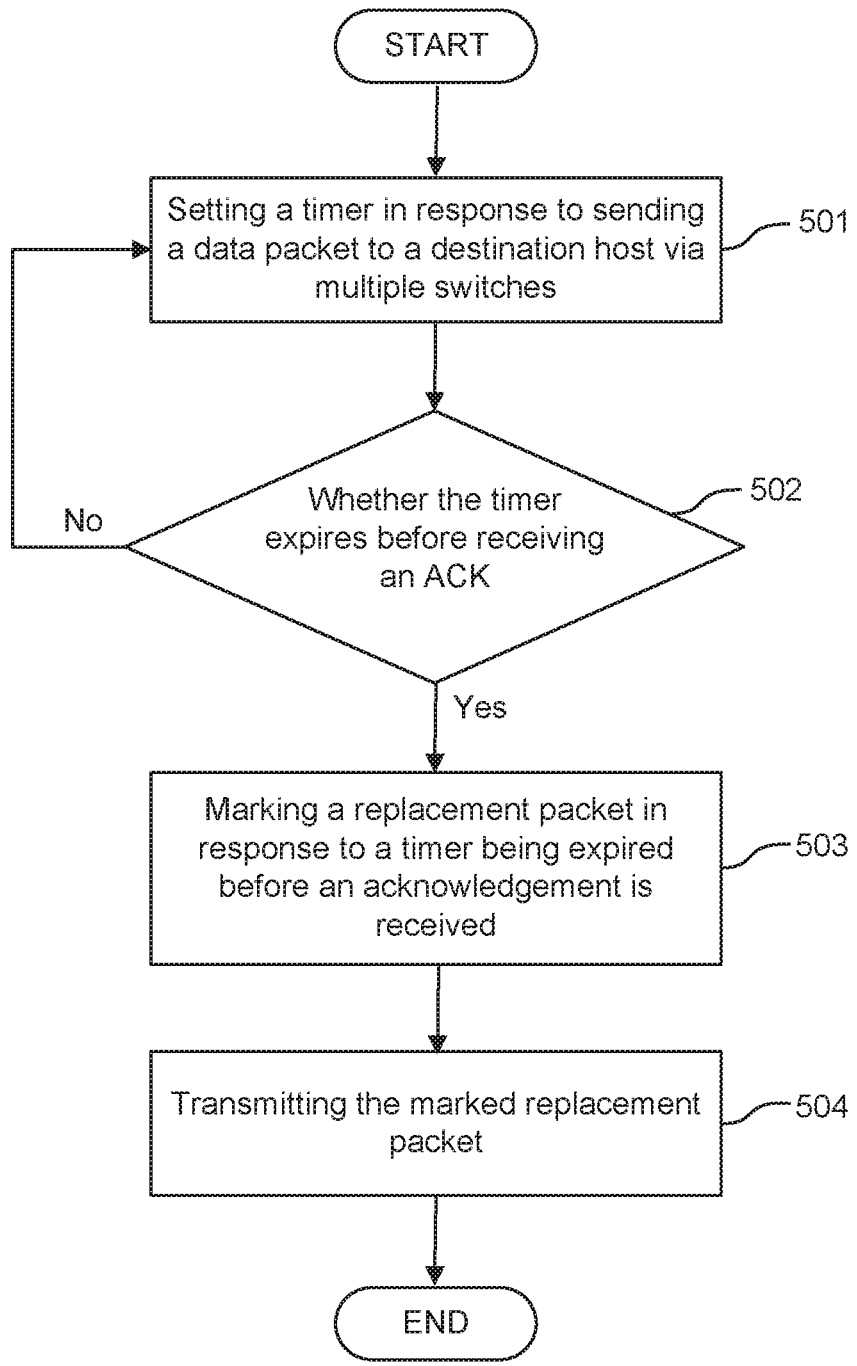
FIG. 5 illustrates a flow chart of an exemplary method for retransmission by a source host to a destination host, consistent with some embodiments of the present disclosure.
Figure 6:
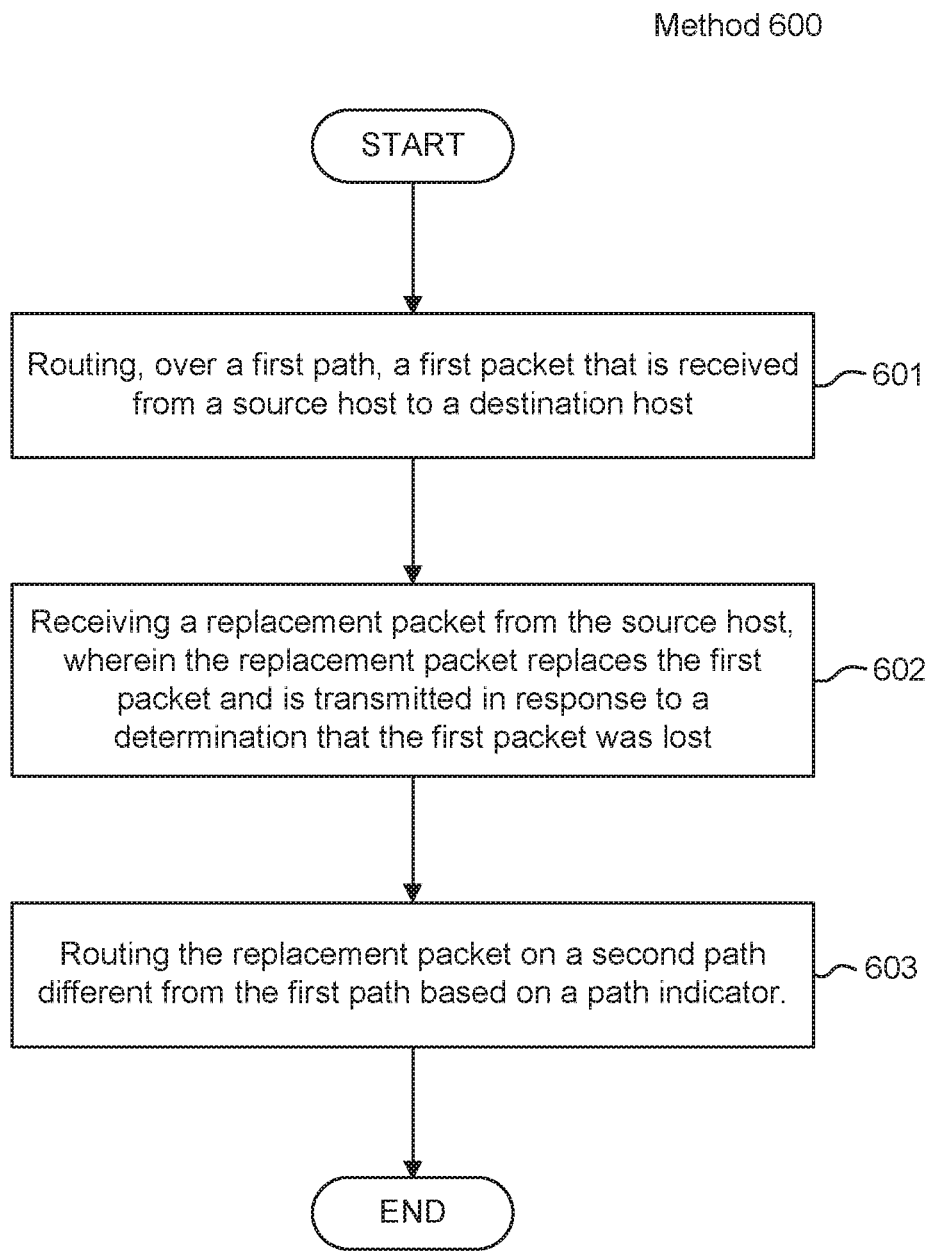
FIG. 6 illustrates a flow chart of an exemplary method for retransmission by a switch, consistent with some embodiments of the present disclosure.
Figure 7:
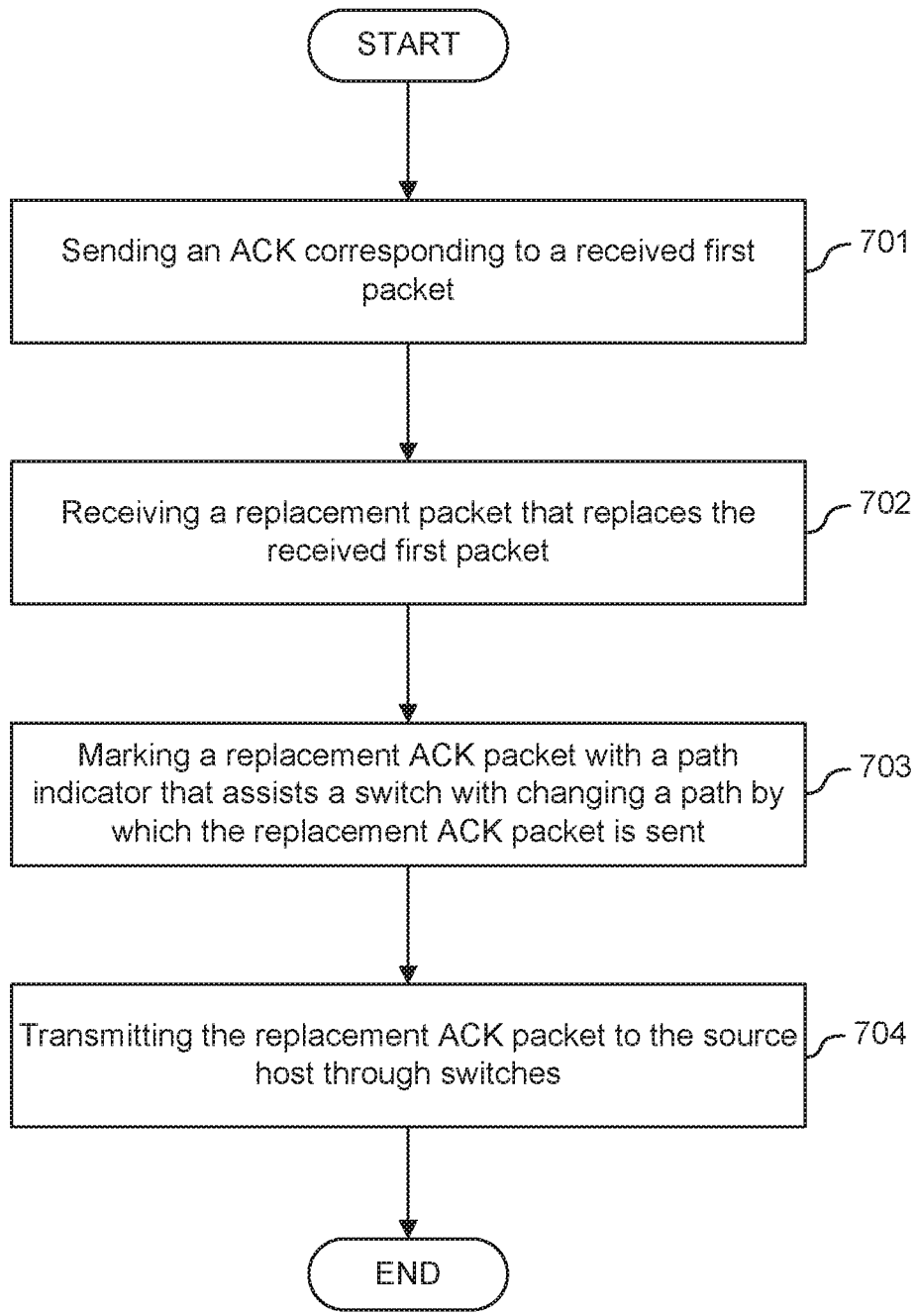
FIG. 7 illustrates a flow chart of an exemplary method for retransmission by a destination host, consistent with some embodiments of the present disclosure.

In a data center, a source host, a top-level switch, and optionally a destination host can coordinate to perform retransmission by including an indicator of replacement packets. FIG. 5, FIG. 6, and FIG. 7 respectively illustrate exemplary methods performed by a source host, a switch and a destination host for facilitating retransmission. First, FIG. 5 illustrates a flow chart of an exemplary method 500 of data retransmission by a source host in a data center, consistent with some embodiments of the present disclosure. The method 500 can include the following steps performed by a source host (e.g., source host 201 of FIG. 2A).

In step 501, a source host sets a timer in response to sending a data packet to a destination host via multiple switches. Corresponding to the transmission of the data packet, a retransmission mechanism can be applied by starting a timer for retransmitting the packet. For example, in TCP transmission, the timer for retransmission of a replacement packet starts when the original packet is sent.

In step 502, the source host determines whether the timer expires before receiving an ACK from the destination host. If the timer expires before receiving the ACK, the method proceeds to step 503. If the source host receives the ACK before the timer expires, the method proceeds to step 501 and can set the next timer for the next data packet.

In step 503, the source host marks a replacement packet with a path indicator in response to a timer expiring before receiving the ACK. The source host can mark the replacement packet by including the path indicator (e.g., flag value of FIG. 4) in the replacement packet. For example, the indicator can be a reserved bit in a TCP header, or similarly, DSCP bits or TTL bits in an IP header. As shown in FIG. 3, the indicator can be in "res" bits in a TCP header. If fields in IP header are used, TTL, a 8-bit byte with values from 0 to 256, can be used. And Similarly, Service Type of DSCP bits in the IP header can also be used to store the indicator.

In step 504, the source host transmits the marked replacement packet. The marking of the replacement packet causes a top-level switch that receives the replacement packet to route at least part of the replacement packet on a different path in comparison to the packet originally sent. The path indicator can be set to default (e.g., 0 as default while 1 as marked) after the different path is selected. The change of flag bits in the TCP header or the IP header allows the switch to automatically determine a different path for the replacement packet based on a determination using the flag bits.

For example, FIG. 6 illustrates a flow chart of an exemplary method for retransmission by a switch, consistent with some embodiments of the present disclosure. The method includes the following steps.

In step 601, a switch routes over a first path a first packet that is received from a source host to a destination host. The first packet can be a data packet or an ACK. For example, as shown in FIG. 2A and FIG. 2B, top-level switch 203 routes a data packet to a destination host on a path that includes link 210. The data packet is received from source host 201. The first path can start from top-level switch 203 and ends at destination host 202 and can contain links between connected switches and destination host 202. When one of the links (e.g., link 210 shown in FIG. 2A) on the first path has failed, the first packet (e.g. the data packet in the exemplary system in data center 200) is lost.

Now referring back to FIG. 6, in step 602, the switch receives a replacement packet from the source host. The replacement packet replaces the first packet and is transmitted in response to a determination that the first packet was lost. For example, a source host may not receive an ACK corresponding to the first packet and may transmit the replacement packet.

In step 603, the switch routes the replacement packet on a second path different from the first path based on a path indicator. The path indicator is associated with path selection. For example, in a TCP header field, the path indicator can be part of the reserved 4 bits as part of a hash. Using header information from the replacement packet, the switch routes the replacement packet on a second path different from the first path. In some embodiments, the second path is selected using a hash algorithm. Using the header information from the replacement packet, the hashing function can be used in determining a path between a top-level switch and a destination host. For example, Equation 1 described above can be used for determining the path.

FIG. 7 illustrates a flow chart of an exemplary method for retransmission by a destination host, consistent with embodiments of the present disclosure. For example, the destination host can be destination host 202 of FIG. 2B. The method 700 can include the following steps.

In step 701, the destination host sends an ACK corresponding to a received first packet. In TCP transmission, an ACK is sent in response to receiving a packet.

In step 702, the destination host receives a replacement packet (e.g., a data packet) that replaces the received first packet. In retransmission mechanism, the replacement packet is sent by the source host if the source host had not received the ACK before expiring of a retransmission timer. The retransmission mechanism is used for a failed link that causes a loss of a data packet or a loss of an ACK. Since the destination host has received the first data packet, it can be determined that the link for transmitting the data packet remains functioning. It can also be determined that the sent ACK was lost because the destination host has sent the ACK, but still receives the replacement packet from the source host. Therefore, in the following steps, a replacement ACK can be sent on a different path to address the link failure.

In step 703, the destination host marks a replacement ACK packet with a path indicator that can assist a switch with changing a path by which the replacement ACK packet is sent. The indicator can be a reserved bit in a TCP header, or similarly, DSCP bits in an IP header.

In step 704, the destination host transmits the replacement ACK packet to the source host through switches. When a top-level switch receives the replacement ACK packet, the switch can perform hashing on path selection. For example, a path index can be altered to a different number when the indicator is included in calculation. The hashing process is same when the switch receives a replacement data packet as illustrated in FIG. 2A and FIG. 2B.

Figure 8:
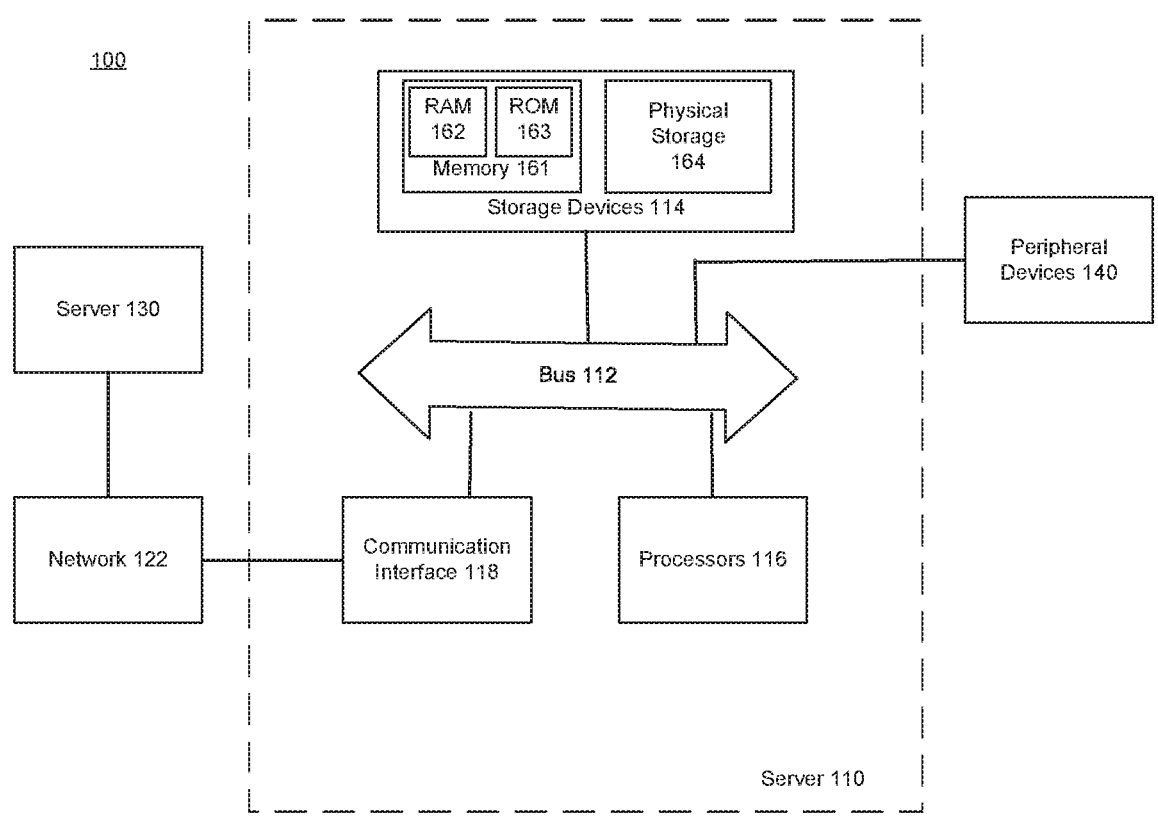
FIG. 8 illustrates a schematic diagram of an exemplary server, consistent with some embodiments of the present disclosure.

FIG. 8 illustrates a schematic diagram of an exemplary server, according to some embodiments of the present disclosure. According to FIG. 8, server 110 comprises a bus 112 or other communication mechanism for communicating information, and one or more processors 116 communicatively coupled with bus 112 for processing information. Processors 116 can be, for example, one or more microprocessors and can include one or more hardware accelerators. In some embodiments, server 110 can be one of a source host, a switch, or a destination host. It is appreciated that method 500, method 600 and method 700 can be performed by server 110 of FIG. 8.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a component ay include A or B, then, unless specifically stated otherwise or infeasible, the component may include A, or B, or A and B. As a second example, if it is stated that a component may include A, B, or C, then, unless specifically stated otherwise or infeasible, the database may include A, or B, or C, or A and B, or A and C, or B and C, or A and B and C.

The embodiments may further be described using the following clauses:

1. A method for data transmission by a switch over a network, comprising:
   transmitting, by the switch, over a first path, a first packet that is received from a first host to a second host;
   receiving a replacement packet from the first host, wherein the replacement packet is transmitted from the first host in response to a determination that the first packet was lost and wherein the replacement packet includes a path indicator; and
   based on the path indicator of the replacement packet, transmitting, over a second path different from the first path, at least part of the replacement packet to the second host.

2. The method according to clause 1, wherein the path indicator is one of reserved bits in a TCP header, TTL bits in an IP header, or DSCP bits in an IP header.

3. The method according to any one of clauses 1-2, wherein the replacement packet is one of a data packet or an acknowledgement (ACK) packet.

4. The method according to any one of clauses 1-3, wherein the switch is programmable to define a hash algorithm used to select the second path.

5. The method according to any one of clauses 1-3, wherein the switch is a top-level switch that connects directly with tier-1 switches, the first host connects directly with one of the tier-1 switches, and the second host connects directly with another of the tier-1 switches.

6. The method according to any one of clauses 1-3, wherein the second path is selected by applying hash operations on path section using the path indicator.

7. A switch for data transmission, comprising:
   a memory storing a set of instructions; and
   one or more processors configured to execute the set of instruction to cause the switch to perform:
   transmitting, over a first path, a first packet that is received from a first host to a second host,
   receiving a replacement packet from the first host, wherein the replacement packet is transmitted from the first host in response to a determination that the first packet was lost and wherein the replacement packet includes a path indicator, and
   based on the path indicator of the replacement packet, transmitting, over a second path different from the first path, at least part of the replacement packet to the second host.

8. The switch of clause 7, wherein the path indicator is one of reserved bits in a TCP header, TTL bits in an IP header, or DSCP bits in an IP header.

9. The switch of any one of clauses 7-8, wherein the replacement packet is one of a data packet or an acknowledgement (ACK) packet.

10. The switch of any one of clauses 7-9, wherein the switch is programmable to define a hash algorithm used to select the second path.

11. The switch of any one of clauses 7-9, wherein the switch is a top-level switch is configured to connect directly with a first tier-1 switch that is communicatively coupled to the first host and a second tier-1 switch communicatively coupled with the second host.

12. The switch of any one of clauses 7-9, wherein the second path is selected by applying hash operations on path section using the path indicator.

13. A non-transitory computer readable medium that stores a set of instructions that is executable by at least one processor of a computer to cause the computer to perform a method for data transmission, the method comprising:
   transmitting, over a first path, a first packet that is received from a first host to a second host;
   receiving a replacement packet from the first host, wherein the replacement packet is transmitted from the first host in response to a determination that the first packet was lost and wherein the replacement packet includes a path indicator; and
   based on the path indicator of the replacement packet, transmitting, over a second path different from the first path, at least part of the replacement packet to the second host.

14. The computer readable medium of clause 13, wherein the path indicator is one of reserved bits in a TCP header, TTL bits in an IP header, or DSCP bits in an IP header.

15. The computer readable medium of any one of clauses 13-14 wherein the replacement packet is one of a data packet or an acknowledgement (ACK) packet.

16. The computer readable medium of any one of clauses 13-15, wherein the second path can be selected using a hash algorithm defined by a programmable switch.

17. The computer readable medium of any one of clauses 13-15, wherein the second path is selected by applying hash operations on path section using the path indicator.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A method for data transmission by a switch over a network, comprising:
   transmitting, by the switch, over a first path, a first packet that is received from a first host to a second host;
   receiving a replacement packet from the first host, wherein the replacement packet is transmitted from the first host in response to a determination that the first packet was lost and wherein the replacement packet includes a path indicator; and
   based on the path indicator of the replacement packet, transmitting, over a second path different from the first path, at least part of the replacement packet to the second host;
   wherein the path indicator is one of reserved bits in a TCP header, TTL bits in an IP header, or DSCP bits in an IP header.

2. The method according to claim 1, wherein the replacement packet is one of a data packet or an acknowledgement (ACK) packet.

3. The method according to claim 1, wherein the switch is programmable to define a hash algorithm used to select the second path.

4. The method according to claim 1, wherein the switch is a top-level switch that connects directly with tier-1 switches, the first host connects directly with one of the tier-1 switches, and the second host connects directly with another of the tier-1 switches.

5. The method according to claim 1, wherein the second path is selected by applying hash operations on path section using the path indicator.

6. A switch for data transmission, comprising:
   a memory storing a set of instructions; and
   one or more processors configured to execute the set of instruction to cause the switch to perform:
   transmitting, over a first path, a first packet that is received from a first host to a second host, receiving a replacement packet from the first host, wherein the replacement packet is transmitted from the first host in response to a determination that the first packet was lost and wherein the replacement packet includes a path indicator, and based on the path indicator of the replacement packet, transmitting, over a second path different from the first path, at least part of the replacement packet to the second host;

wherein the path indicator is one of reserved bits in a TCP header, TTL bits in an IP header, or DSCP bits in an IP header.

7. The switch of claim 6, wherein the replacement packet is one of a data packet or an acknowledgement (ACK) packet.

8. The switch of claim 6, wherein the switch is programmable to define a hash algorithm used to select the second path.

9. The switch of claim 6, wherein the switch is a top-level switch is configured to connect directly with a first tier-1 switch that is communicatively coupled to the first host and a second tier-1 switch communicatively coupled with the second host.

10. The switch of claim 6, wherein the second path is selected by applying hash operations on path section using the path indicator.

11. A non-transitory computer readable medium that stores a set of instructions that is executable by at least one processor of a computer to cause the computer to perform a method for data transmission, the method comprising:

transmitting, over a first path, a first packet that is received from a first host to a second host;

receiving a replacement packet from the first host, wherein the replacement packet is transmitted from the first host in response to a determination that the first packet was lost and wherein the replacement packet includes a path indicator; and based on the path indicator of the replacement packet, transmitting, over a second path different from the first path, at least part of the replacement packet to the second host;

wherein the path indicator is one of reserved bits in a TCP header, TTL bits in an IP header, or DSCP bits in an IP header.

12. The computer readable medium of claim 11, wherein the replacement packet is one of a data packet or an acknowledgement (ACK) packet.

13. The computer readable medium of claim 11, wherein the second path can be selected using a hash algorithm defined by a programmable switch.

14. The computer readable medium of claim 11, wherein the second path is selected by applying hash operations on path section using the path indicator.

* * * * *